US012112081B2

(12) United States Patent
Hayashi

(10) Patent No.: US 12,112,081 B2
(45) Date of Patent: Oct. 8, 2024

(54) INFORMATION PROCESSING APPARATUS AND PRINTING AUTHORITY MANAGEMENT SYSTEM

(71) Applicant: BROTHER KOGYO KABUSHIKI KAISHA, Nagoya (JP)

(72) Inventor: Koichi Hayashi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/149,201

(22) Filed: Jan. 3, 2023

(65) Prior Publication Data

US 2023/0221905 A1    Jul. 13, 2023

(30) Foreign Application Priority Data

Jan. 13, 2022   (JP) .................................. 2022-003988

(51) Int. Cl.
*G06F 3/12*       (2006.01)
*G06Q 20/14*    (2012.01)
*G06Q 20/40*    (2012.01)

(52) U.S. Cl.
CPC .......... *G06F 3/1238* (2013.01); *G06F 3/1203* (2013.01); *G06Q 20/145* (2013.01); *G06Q 20/401* (2013.01)

(58) Field of Classification Search
None
See application file for complete search history.

(56) References Cited

U.S. PATENT DOCUMENTS

| | | | | |
|---|---|---|---|---|
| 9,972,047 | B1* | 5/2018 | Elliott | G06Q 30/02 |
| 11,827,029 | B2* | 11/2023 | Shaw | G06N 20/00 |
| 2003/0200144 | A1* | 10/2003 | Antonucci | G06Q 30/0227 |
| | | | | 705/14.28 |
| 2005/0043992 | A1* | 2/2005 | Cohagan | G06Q 30/02 |
| | | | | 705/14.27 |
| 2009/0322522 | A1* | 12/2009 | Meunier | G06Q 10/06 |
| | | | | 340/540 |

(Continued)

FOREIGN PATENT DOCUMENTS

| | | |
|---|---|---|
| JP | 2021-018621 A | 2/2021 |
| JP | 2021-068372 A | 4/2021 |

*Primary Examiner* — Helen Zong
(74) *Attorney, Agent, or Firm* — Scully, Scott, Murphy & Presser, PC

(57) ABSTRACT

An information processing apparatus, which is communicable with a printing device, includes a control device configured to: receive an obtainment application of paid authority information guaranteeing a paid guaranteed printing amount by a purchasing user; add a value of the paid guaranteed printing amount relating to the corresponding paid authority information to a value of an allowable printing amount for the printing device; associate free authority information guaranteeing a free guaranteed printing amount corresponding to the paid guaranteed printing amount with identification information of the printing device; receive a utilization application of the free authority information associated with the identification information of the printing device; and add a value of a utilized printing amount within the free guaranteed printing amount corresponding to the free authority information to the value of the allowable printing amount.

19 Claims, 8 Drawing Sheets

(56) References Cited

U.S. PATENT DOCUMENTS

| | | | |
|---|---|---|---|
| 2010/0240443 A1* | 9/2010 | Baerlocher | G07F 17/3255 |
| | | | 463/16 |
| 2011/0191197 A1* | 8/2011 | VanWinkle | G06Q 40/12 |
| | | | 705/26.1 |
| 2019/0005531 A1* | 1/2019 | Hatakeyama | G06Q 30/0226 |
| 2020/0118156 A1* | 4/2020 | Bloy | G06Q 30/0233 |
| 2020/0226636 A1* | 7/2020 | Kim | G06Q 20/10 |
| 2021/0099609 A1* | 4/2021 | Nishimura | H04N 1/00424 |
| 2021/0253290 A1* | 8/2021 | Bass | B65B 57/02 |
| 2022/0137891 A1 | 5/2022 | Kawaguchi et al. | |
| 2023/0093971 A1* | 3/2023 | Takijiri | H04N 1/32662 |
| | | | 358/1.13 |
| 2023/0105046 A1* | 4/2023 | Groset | G06Q 50/34 |
| | | | 705/14.3 |

\* cited by examiner

FIG. 3A

PURCHASED SERVICE SETTING TABLE

| BILLING PLAN | AMOUNT OF MONEY | NUMBER OF PURCHASED SHEETS | GENERATED POINT |
|---|---|---|---|
| BILLING PLAN 100 | 1,000 YEN | 100 | 10 |
| BILLING PLAN 200 | 2,000 YEN | 200 | 25 |
| ... | | | |

FIG. 3B

POINT SERVICE SETTING TABLE

| POINT UTILIZATION PLAN | POINTS TO BE USED | NUMBER OF ADDITIONAL SHEETS |
|---|---|---|
| POINT UTILIZATION PLAN 50 | 50 | 50 |
| POINT UTILIZATION PLAN 80 | 80 | 80 |

FIG. 3C

PURCHASING AND UTILIZING USER MANAGEMENT TABLE CORRESPONDING TO MULTIFUNCTION PERIPHERAL INDIVIDUAL X

| USER ID | USER IDENTIFICATION INFORMATION |
|---|---|
| A | ******@example.com |
| B | 000000@example.com |

FIG. 4

EVENT MANAGEMENT TABLE CORRESPONDING TO MULTIFUNCTION PERIPHERAL INDIVIDUAL X

| EVENT MANAGEMENT NO. | INSTRUCT-ING USER | CONTENT OF EVENTS | DATE | PRODUCT | PRICE | GENERATED POINT | UTILIZATION POINT | SHARED ACCUMULATED POINT | INCREASE OR DECREASE IN NUMBER OF SHEETS | NUMBER OF PRINTABLE SHEETS |
|---|---|---|---|---|---|---|---|---|---|---|
| 00001 | A | PURCHASE | 2021/1/18 | 100 SHEETS | 1,000 YEN | 10 | --- | 10 | +100 | 100 SHEETS |
| 00002 | A | PRINT | 2021/1/18 | --- | --- | --- | --- | 10 | -80 | 20 SHEETS |
| 00003 | B | PURCHASE | 2021/1/19 | 200 SHEETS | 2,000 YEN | 25 | --- | 35 | +200 | 220 SHEETS |
| 00004 | B | PRINT | 2021/1/19 | --- | --- | --- | --- | 35 | -150 | 70 SHEETS |
| 00005 | A | PURCHASE | 2021/1/20 | 200 SHEETS | 2,000 YEN | 25 | --- | 60 | +200 | 270 SHEETS |
| 00006 | --- | UTILIZATION | 2021/1/21 | --- | --- | --- | 50 | 10 | +50 | 320 SHEETS |
| ... | | | | | | | | | | ... |

FIG. 8

PURCHASING AND UTILIZING USER MANAGEMENT TABLE

| USER ID | USER IDENTIFICATION INFORMATION | USER-SPECIFIC ACCUMULATED POINT |
|---|---|---|
| A | ******@example.com | 20 |
| B | 000000@example.com | 35 |

INFORMATION PROCESSING APPARATUS AND PRINTING AUTHORITY MANAGEMENT SYSTEM

REFERENCE TO RELATED APPLICATIONS

This application claims priority from Japanese Patent Application No. 2022-003988 filed on Jan. 13, 2022. The entire content of the priority application is incorporated herein by reference.

BACKGROUND ART

To a printing service in which a user who uses a printing device pays a billing fee according to a printing content to a service provider, a prepaid billing system may be introduced. In this case, the user can obtain printing authority information for a fee and perform printing based on a print guarantee amount that the printing authority information guarantees.

A related art discloses a technology of adding a print guarantee amount guaranteed by printing authority information that the user obtains for a fee, to a value of an allowable printing amount that is already allowed for a printing device.

DESCRIPTION

According to the related-art technology, obtainment of printing authority other than a method in which a user obtains printing authority information for a fee is not considered.

Here, a case where, whenever the user obtains printing authority information for a fee, free authority information is given according to the size of a paid print guarantee amount guaranteed by the printing authority and is added to an amount of an allowable printing amount according to an accumulated value of free print guarantee amounts which respective items of free authority information guarantee is considered. In this case, when the obtainment of the paid authorization information is repeated to accumulate the free print guarantee amount to some extent, the accumulated free print guarantee amount is converted to the allowable printing amount to increase the allowable printing amount in the printing device for free.

Also, if the free authority information for increasing the allowable printing amount by accumulating the free print guarantee amount as above is not given to a specific user but given to a printing device, when the corresponding printing device is jointly used by a plurality of users, the respective users can benefit from the increase in the allowable printing amount of the printing device.

Illustrative aspects of the present disclosure provide an information processing apparatus and a printing authority management system that can achieve utilization promotion of a prepaid printing service by enabling each user who uses the printing device to increase an allowable printing amount based on given free authority information.

According to one illustrative aspect of the present disclosure, provided is an information processing apparatus including: a communication interface that is communicable with a printing device configured to form an image on a printing medium via a network; and a control device configured to: receive an obtainment application of paid authority information, the paid authority information guaranteeing a paid guaranteed printing amount by a purchasing user; whenever the obtainment application of the paid authority information is received, add a value of the paid guaranteed printing amount relating to the corresponding paid authority information to a value of an allowable printing amount for the printing device; perform a first authorization process including associating free authority information with identification information of the printing device, the free authority information guaranteeing a free guaranteed printing amount corresponding to the paid guaranteed printing amount; receive a first utilization application, the first utilization application including a utilization application of the free authority information associated with the identification information of the printing device; and based on receiving the first utilization application, add a value of a utilized printing amount to the value of the allowable printing amount, the utilized printing amount being within the free guaranteed printing amount corresponding to the free authority information associated with the identification information of the printing device.

In the information processing apparatus according to the present disclosure, the control device is configured to receive an obtainment application of paid authority information (e.g., an obtainment application reception process), add a value of the paid guaranteed printing amount (e.g., a paid printing amount addition process), and perform a first authorization process. If each purchasing user applies obtainment of paid authority information for a printing device, the application is received in the obtainment application reception process. When the obtainment application of the paid authority information is received in the obtainment application reception process, a value of a paid guaranteed printing amount according to the corresponding paid authority information is added to a value of the allowable printing amount in the printing device in the paid printing amount addition process. The purchasing user can increase the value of the allowable printing amount by an amount corresponding to the purchase of the paid authority information by himself/herself.

According to the present disclosure, also, free authority information for guaranteeing a free guaranteed printing amount corresponding to a paid guaranteed printing amount relating to the corresponding paid authority information is generated. The generated free authority information is associated with the identification information of the printing device. According to the present disclosure, since the free authority information is associated with the printing device, any user who uses the corresponding printing device can utilize the corresponding free authority information.

In the information processing apparatus according to the present disclosure, the control device is configured to receive a first utilization application (e.g., a first utilization application receiving process) and add a value of a utilized printing amount (e.g., a first free printing amount addition process). The application of the utilization of the corresponding free authority information is received in the first utilization application receiving process. When the utilization application of the free authority information is received in the first utilization application receiving process, the value of the free guaranteed printing amount by which utilization is requested, within the free guaranteed printing amounts corresponding to the free authority information associated with the printing device is added to the value of the allowable printing amount in the first free printing amount addition process. The authority utilizing user can increase the value of the allowable printing amount by which the utilization is applied by the user, within the free guaranteed printing amounts of the free authority information associated with the printing device.

According to the present disclosure, since the free authority information that guarantees the free guaranteed printing amount is associated with the printing device, the users who use the printing device can increase the values of the allowable printing amounts of the printing device for free by performing utilization applications, respectively, and thus the convenience increases. According to the present disclosure, utilization promotion of a prepaid printing service can be achieved by the increase of the convenience.

According to another illustrative aspect of the present disclosure, provided is a printing authority management system including: a printing device configured to form an image on a printing medium within an allowed allowable printing amount; and a control device configured to: receive an obtainment application of paid authority information, the paid authority information guaranteeing a paid guaranteed printing amount by a purchasing user for each purchasing user; whenever the obtainment application of the paid authority information is received, add a value of the paid guaranteed printing amount relating to the corresponding paid authority information to a value of the allowable printing amount; associate free authority information with identification information of the printing device, the free authority information guaranteeing a free guaranteed printing amount corresponding to the paid guaranteed printing amount; receive a first utilization application, the first utilization application including a utilization application of the free authority information associated with the identification information of the printing device by an authority utilizing user; and based on receiving the first utilization application, add a value of the utilized printing amount to the value of the allowable printing amount, the utilized printing amount being within the free guaranteed printing amount corresponding to the free authority information associated with the identification information of the printing device.

According to the present disclosure, utilization promotion of a prepaid printing service can be achieved by enabling users who use printing devices to increase allowable printing amounts based on given free authority information.

FIG. 3A to 3C are diagrams respectively schematically illustrating a purchased service setting table, a point service setting table, and a purchasing and utilizing user management table corresponding to the multifunction peripheral individual X that a management server stores.

FIG. 4 is a diagram schematically illustrating an event management table corresponding to the multifunction peripheral individual X that the management server stores.

FIG. 8 is a diagram schematically illustrating a purchasing and utilizing user management table corresponding to the multifunction peripheral individual X when accumulated points per user are set.

An illustrative embodiment according to the present disclosure is described with reference to the drawings.

Figure 1:
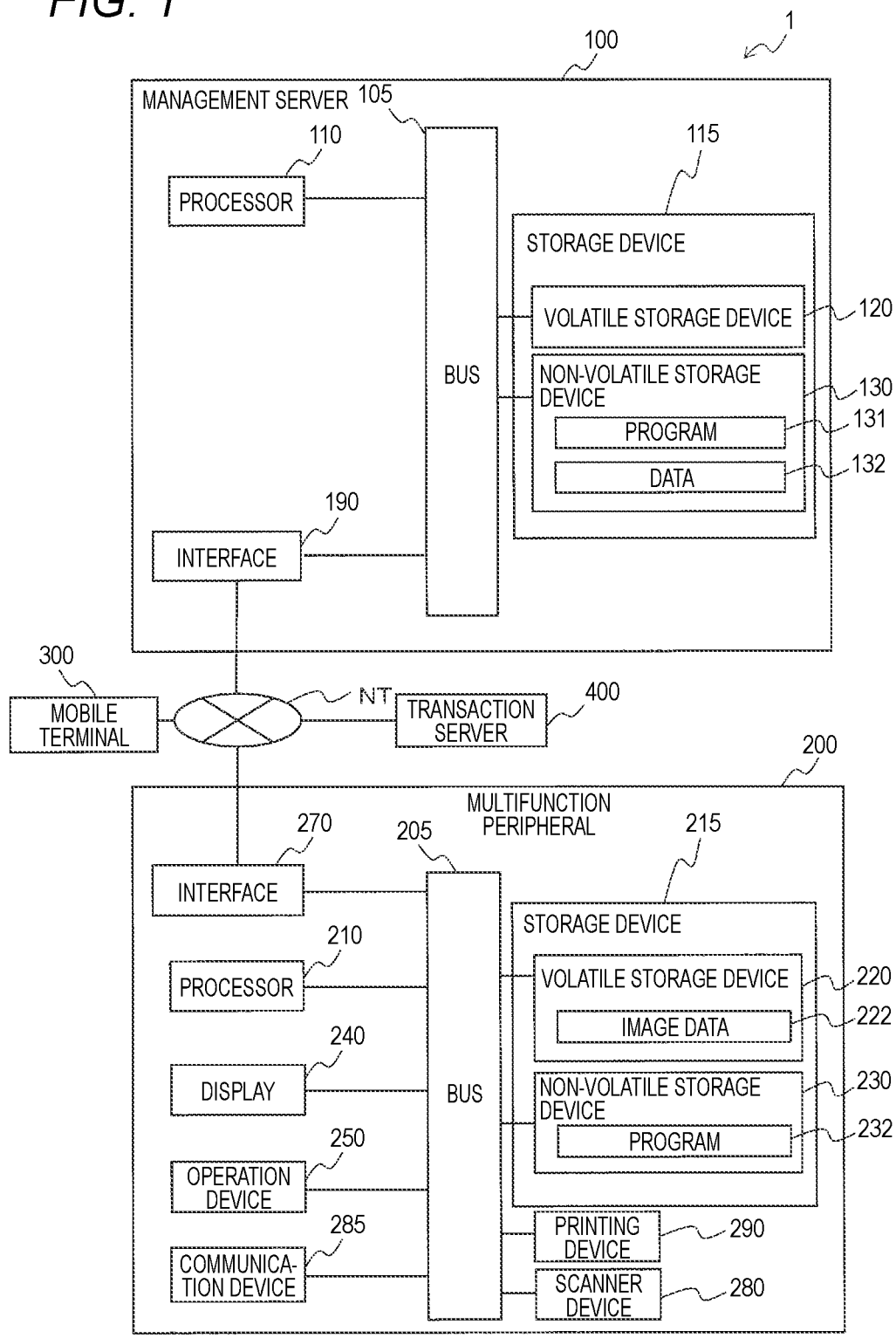
FIG. 1 is a functional block diagram illustrating the entire schematic configuration of a printing service providing system according to an illustrative embodiment of the present disclosure.

A system configuration of a printing service providing system in a printing authority management system according to an illustrative embodiment of the present disclosure is illustrated in FIG. 1. The present illustrative embodiment is an illustrative embodiment of a printing service providing system 1 that can provide a prepaid printing service in which a user who is a customer pays a fee in advance and uses the printing function of a multifunction peripheral.

{Summary of Printing Service Providing System}

In FIG. 1, this printing service providing system 1 includes a management server 100, a multifunction peripheral 200, a mobile terminal 300, and a transaction server 400. The management server 100, the multifunction peripheral 200, the mobile terminal 300, and the transaction server 400 are connected to a network NT including a mobile phone communication line and can communicate with each other. In addition, the management server 100 is an example of the information processing apparatus, the multifunction peripheral 200 is an example of the printing device, and the mobile terminal 300 is an example of an external device that is an example of the information terminal.

{Management Server}

The management server 100 is a server that is installed and managed, for example, by a manufacturer of the multifunction peripheral 200, and includes a processor 110, a storage device 115, and an interface 190. The processor 110, the storage device 115, and the interface 190 are connected to each other via a bus 105.

The storage device 115 includes a volatile storage device 120 and a non-volatile storage device 130. The volatile storage device 120 is, for example, a DRAM (which is an abbreviation for "dynamic random access memory") and stores various programs and data to be processed. The non-volatile storage device 130 is, for example, a hard disk drive or a solid-state drive and includes a program storage area 131 and a data storage area 132.

Various programs are stored in the program storage area 131. As illustrated in FIGS. 3A to 3C and 4 described below, various kinds of table information that store settings of purchased services, settings of point services, user management, information on events performed by each of the multifunction peripheral 200 are stored in the data storage area 132.

The processor 110 is a device that performs data processing, for example, a CPU (which is an abbreviation for "central processing unit"), and executes various programs including programs relating to a prepaid printing service according to the present illustrative embodiment that are stored in the program storage area 131. The processor 110 performs various processes including data communication with the mobile terminal 300, the multifunction peripheral 200, and the transaction server 400 that are connected to the network NT. The processor 110 performs processes relating to the purchased service or the point service by the printing service providing system 1 according to the present illustrative embodiment, in cooperation with the multifunction peripheral 200 and the mobile terminal 300.

The interface 190 is a wired LAN interface or a wireless interface for communicating with other devices and is connected to the network NT. "LAN" is an abbreviation for "local area network."

In addition, the storage device 115 is not limited to the configuration of device elements described above, and may be configured, for example, with a RAM (which is an abbreviation for "random access memory"), a ROM (which is an abbreviation for "read only memory"), an EEPROM (which is an abbreviation for "electrically erasable programmable read only memory"), an HDD (which is an abbreviation for "hard disk drive"), a portable recording medium such as a USB memory that is detachable from the mobile terminal 300, a buffer in the processor 110, or a combination thereof "USB" is an abbreviation for "universal serial bus."

In addition, the storage device 115 may be a computer-readable storage medium. The computer-readable storage medium is a non-transitory medium. The non-transitory medium includes a recording medium such as CD-ROM and DVD-ROM in addition to the above examples. In addition, the non-transitory medium is a tangible medium.

The same is applied to a storage device 215 of the multifunction peripheral 200 described below.

In addition, programs of the program storage area 131, and the processor 110 that executes the programs are an example of the control device of the information processing apparatus, and the interface 190 is an example of the communication FF.

{Multifunction Peripheral}

The multifunction peripheral 200 is owned by, for example, a printing service provider that provides the prepaid printing service or a user. The multifunction peripheral 200 includes a scanner device 280, a printing device 290, a processor 210, the storage device 215, a display 240, an operation device 250, a communication device 285, and a communication interface 270. The scanner device 280, the printing device 290, the processor 210, the storage device 215, the display 240, the operation device 250, the communication device 285, and the communication interface 270 are connected to each other via a bus 205.

The storage device 215 includes a volatile storage device 220 and a non-volatile storage device 230. The volatile storage device 220 is, for example, a DRAM and includes an image data storage area 222 that stores image data to be printed. The non-volatile storage device 230 is, for example, a flash memory and includes a program storage area 232. Various programs are stored in the program storage area 232, for example, as firmware.

The Processor 210 is a Device that Performs Data Processing and, for Example, is a CPU. The Processor 210 Executes Various Programs Stored in the Program Storage Area 232.

The display 240 is, for example, a liquid crystal display and can display various kinds of information. The operation device 250 is a device that receives an operation by a user. The user can input various instructions to the multifunction peripheral 200 by operating the operation device 250. The communication interface 270 is a wired or wireless network interface that communicates with other devices and is connected to the network NT.

The scanner device 280 reads a document, which is an object to be optically read, by using photoelectric conversion elements such as CCD and CMOS to generate scan data representing the read image.

The printing device 290 picks up and conveys paper in a paper feed tray by a conveyance mechanism (not illustrated) and also prints an image on the conveyed paper by a predetermined method. Hereinafter, a case where printing is performed in an inkjet method is described. The printing device 290 forms an image on paper by using ink in an ink cartridge detachably attached to a cartridge holder (not illustrated) according to a print job sent from the mobile terminal 300 or a print job generated based on an operation on the operation device 250. In addition, the paper is an example of a printing medium.

The communication device 285 is, for example, a terminal and is electrically connected to a cartridge memory (IC chip) in the ink cartridge attached to the cartridge holder.

{Mobile Terminal}

The mobile terminal 300 is, for example, a portable terminal such as a smart phone possessed by a user and is connected to the network NT via wireless communication. The mobile terminal 300 includes a processor, a storage device, and an interface connected to the network NT (not illustrated).

Various programs are stored in a program storage area in the storage device. The various programs include various programs relating to the provision of the prepaid printing service according to the present illustrative embodiment based on sequence flows of FIGS. 5 to 7 described below, together with data communication to the management server 100, the multifunction peripheral 200, and the transaction server 400 which are connected to the network NT. The processor executes various programs stored in the program storage area and performs a processing method relating to the prepaid printing service by the printing service providing system 1 according to the present illustrative embodiment in cooperation with the management server 100 or the multifunction peripheral 200.

Also, the mobile terminal 300 displays various kinds of information and receives various operations by the user with a touch panel obtained by integrally combining a liquid crystal display and a touch pad (particularly not illustrated). By operating the touch panel, the user can input various instructions to the mobile terminal 300.

In addition, instead of the mobile terminal 300, for example, other information terminals such as a tablet computer or a desktop PC (which is an abbreviation for "personal computer") may be used.

{Transaction Server}

The transaction server 400 is installed, for example, in a company that performs various online services for performing net settlement and includes a processor, a storage device, and an interface for connection to the network NT (not illustrated).

{Features of Illustrative Embodiment}

In a prepaid printing service in which the user purchases printing authority on an individual of the specific multifunction peripheral 200, the features of the present illustrative embodiment with respect to the configuration relates to a process of accumulating service points given according to the purchase in association with the corresponding individual of the multifunction peripheral 200 and sharing with a plurality of users.

{Prepaid Printing Service and Management on Service Point}

A relationship between a purchase in the prepaid printing service according to an example of the present illustrative embodiment and a service point accompanied by the purchase is described. In the printing service providing system 1 according to the present illustrative embodiment described above, the management server 100, the multifunction peripheral 200, the mobile terminal 300, and the transaction server 400 are connected so that information can be transmitted and received via the network NT. As an illustrative embodiment of transmitting and receiving the information, all of the plurality of mobile terminals 300 respectively possessed by the plurality of users and individuals X, Y, and Z (hereinafter, respectively referred to as the multifunction peripheral individuals X, Y, and Z) of the plurality of multifunction peripherals 200 installed at the respective locations individually transmit and receive information only to and from the management server 100, and the corresponding management server 100 centrally manages events respectively performed by all the mobile terminal 300 and all the multifunction peripherals 200 (not illustrated).

Figure 2:
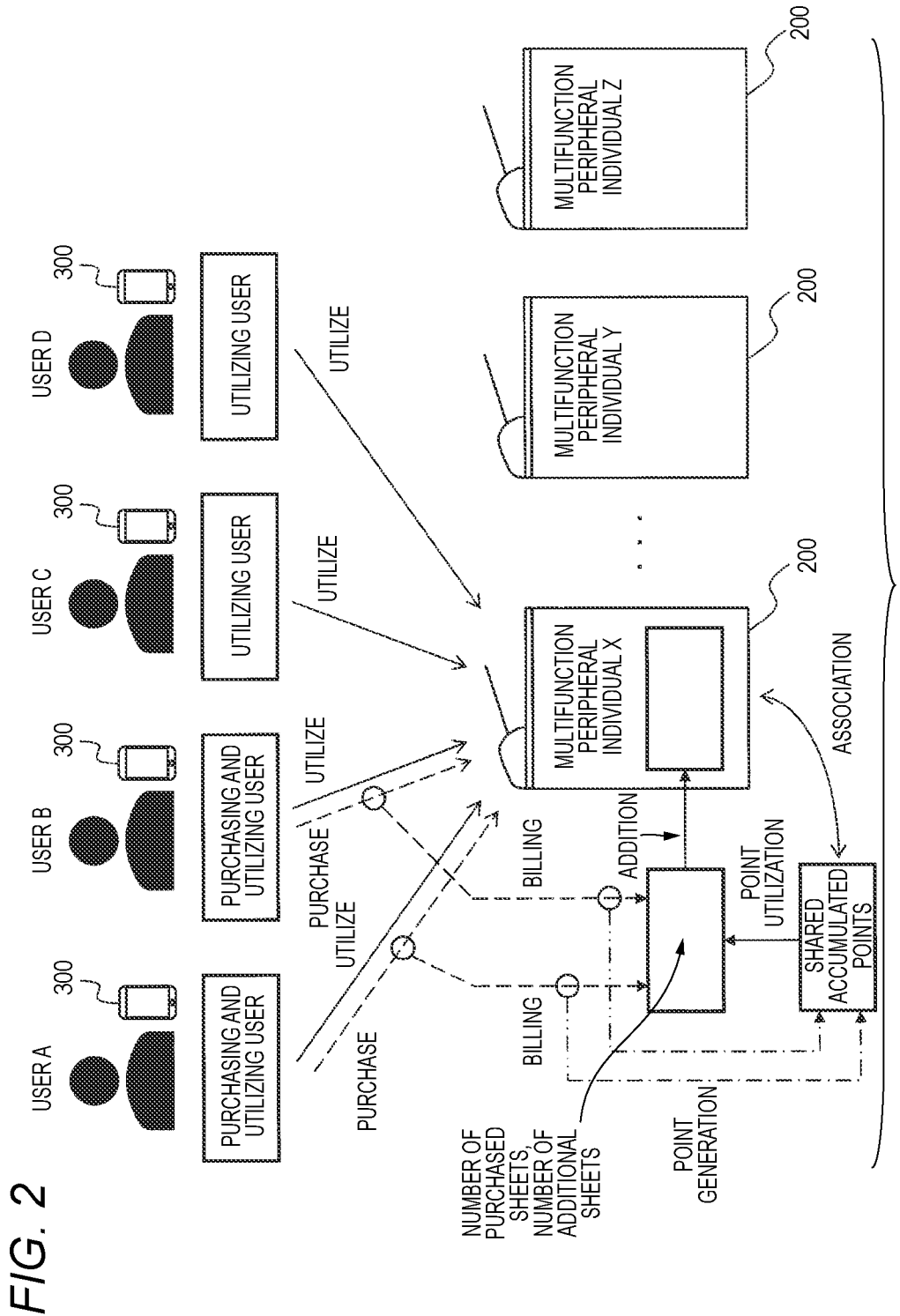
FIG. 2 is a diagram illustrating management of a service point.

Here, in the example according to the present illustrative embodiment, as illustrated in FIG. 2, it is assumed that, for example, one multifunction peripheral individual X that can be used only by a plurality of users A, B, C, and D limitedly registered, such as a family including parents and children, is installed in a general home. Also in this case, the users A, B, C, and D possess the mobile terminals 300, respectively. In this circumstance, all the users A, B, C, and D can utilize the corresponding common multifunction peripheral individual X for respectively and individually instructing printing with desired printing contents by operating the mobile terminals 300. Meanwhile, the printing authority described below can be respectively and individually purchased by the users A and B who are registered as managers who can purchase the printing authority in advance.

Here, the prepaid printing service provided by the corresponding printing service providing system 1 is a service for purchasing a printing authority of a predetermined number of sheets on the specific multifunction peripheral individual X designated by the user via the mobile terminal 300 in advance. That is, the prepaid printing service is in a precharging system in which printing in the multifunction peripheral individual X by the predetermined guaranteed printing amount purchased as the printing authority can be performed. At this time, the printing authority is applied to the designated multifunction peripheral individual X by directly receiving a purchase application of the printing authority from the mobile terminal 300 by the management server 100. Also, as described above, the multifunction peripheral individual X can be utilized under the printing instruction by all the users A, B, C, and D, but the printing authority can be purchased only by the users A and B separately registered to be able to perform purchase in advance. That is, as the user who can utilize the corresponding multifunction peripheral individual X, two types including the purchasing and utilizing users A and B (for example, parents) who are registered to be able to perform both the printing utilization and printing authority purchase and the utilizing users C and D (for example, children) who can perform only printing utilization are set. In addition, the purchasing and utilizing users A and B are an example of the purchasing user, and the utilizing users C and D are an example of the authority utilizing user.

In such a prepaid printing service, the printing authority that the purchasing and utilizing user can purchase on the individual of the multifunction peripheral 200 for a fee is the number of purchased sheets, and, for example, can be purchased by selecting from the plurality of kinds of billing plans including 100 sheets=1,000 yen, and 200 sheets=2,000 yen (see FIG. 3A). Also, the number of purchased sheets that is repeatedly purchased by the purchasing and utilizing users A and B with respect to the specific multifunction peripheral individual X is recorded as the number of printable sheets in the storage device 215 of the corresponding multifunction peripheral individual X in an accumulable manner. In addition, all the users A, B, C, and D who can utilize the multifunction peripheral individual X share the number of printable sheets as share use, the number of printable sheets decreases whenever the printing utilization in the corresponding multifunction peripheral individual X is instructed, and printing can be performed until the number of printable sheets becomes 0. Therefore, the management server 100 sequentially records all event information for each the multifunction peripheral 200 that indicates instruction by which of the mobile terminals 300 to which of the multifunction peripherals 200 on how many number of sheets are purchased and printed and manages history thereof (see FIG. 4). In addition, the number of purchased sheets of each billing plan is an example of the paid guaranteed printing amount, each billing plan is an example of the paid authority information, and the number of printable sheets is an example of the allowable printing amount.

In the printing service providing system 1 under the assumption of such utilization form as above, further, according to the present illustrative embodiment, a service point is generated according to each billing of a purchase event performed by each of the purchasing and utilizing users A and B. This service point is a privilege on a business model, for example, in which 10 points are given for the billing when a printing authority is purchased for a fee in a billing plan of 1,000 yen, and 25 points are given for a billing of 2,000 yen (see FIG. 3A). Also, under the condition in which service points accumulated by repeating the billing reaches a predetermined number or more, the points can be utilized, and the number of printable sheets can be additionally added for free by a guaranteed printing amount that is the same as the number of the predetermined points. In addition, the guaranteed printing amount that is the same as the number of the predetermined points is an example of the free guaranteed printing amount.

Here, as a form of managing the service point, individual allocation and accumulation for each of the purchasing and utilizing users A and B who perform the purchase event is considered as one management form (not illustrated). However, in this case, the printing service providing system 1 may become a service with low convenience, in which accumulation of the service points is dispersed and seldom accumulated.

In contrast, according to the present illustrative embodiment, as illustrated in FIG. 2, service points generated for each purchase event performed on the multifunction peripheral individual X by each of the purchasing and utilizing users A and B are managed to be gathered, summed up, and associated according to the corresponding multifunction peripheral individual X. That is, management is performed so that all the service points generated according to the multifunction peripheral individual X can be accumulated and utilized to be shared by all the purchasing and utilizing users A and B. In addition, the shared accumulated points in this case are an example of the free authority information.

According to the present illustrative embodiment, in order to enable the management of service points in the above form, the management server 100 stores the tables respectively illustrated in FIGS. 3A, 3B, and 3C, and FIG. 4 in the data storage area 132 of the storage device 115. In the purchased service setting table illustrated in FIG. 3A, for each type of billing plans to be selected by the purchasing and utilizing user, each item of an "amount of money" of the billing, the "number of purchased sheets" that is the number of sheets of the guaranteed printing amount that can be purchased, and a "generated point" that is the number of service points generated according to the billing amount of money is recorded.

In the point service setting table illustrated in FIG. 3B, for each type of the point utilization plan to be applied at the time of utilization, each item of "points to be used" required at the time of each utilization and the "number of additional sheets" of the guaranteed printing amount that can be accordingly added is recorded. In the illustrated example, two kinds of plans including a "point utilization plan 50" that requires 50 points as the points to be used and a "point utilization plan 80" that requires 80 points as the points to be used are set.

The purchasing and utilizing user management table corresponding to the multifunction peripheral individual X illustrated in FIG. 3C is a table generated according to multifunction peripheral identification information (particularly not illustrated) set for each individual of the multifunction peripheral 200 (the multifunction peripheral individual X in the illustrated example). In addition, the multifunction peripheral identification information is an example of identification information of the printing device. In the purchasing and utilizing user management table corresponding to the multifunction peripheral individual X, each item of "user identification information" (a mail address in the illustrated example) used in each authentication is recorded for each ID of the purchasing and utilizing user with respect to the corresponding multifunction peripheral individual X. In addition, though particularly not illustrated, such a user management table corresponding to the multifunction peripheral individual X may be set so that the utilizing users C and D of this example can be registered. In this case, for each user, an item of a user type indicating whether the user is a purchasing and utilizing user or a utilizing user is recorded, and a password that is individually set in advance may be recorded in the user identification information.

The event management table corresponding to the multifunction peripheral individual X illustrated in FIG. 4 is a table generated according to the multifunction peripheral identification information (particularly not illustrated) set for each individual of the multifunction peripheral 200 (the multifunction peripheral individual X in the illustrated example). All events in which all the users A, B, C, and D who can utilize the corresponding multifunction peripheral individual X instruct the corresponding multifunction peripheral individual X are recorded in the event management table corresponding to the multifunction peripheral individual X. Specifically, each item including the "instructing user" who instructs to perform each event, performed "date", a "product" indicating the content as a specific number of purchased sheets when the event is a purchase, a "price" thereof, a "generated point" generated accordingly, a "utilization point" used when the event is utilization, a "shared accumulated point" added and subtracted at each event of the purchase and utilization, an "increase or decrease" of the number of printable sheets for the corresponding multifunction peripheral individual X at each event of purchase and printing, and the "number of printable sheets" of the corresponding multifunction peripheral 200 at the time of accumulation calculation by the addition and subtraction is recorded in an order of performing the respective events.

In addition, when only the purchasing and utilizing users A and B are recorded in the user management table, even if the utilizing users C and D performs a printing event or a utilization event, the user cannot be identified, therefore, the recording of the item of the "instructing user" is omitted (see Event Management No. 00006 in the drawing). Meanwhile, when all the users A, B, C, and D are recorded in the user management table, a user identified by the authentication of the password input at the time of event instruction is recorded into the item of an "instructing user" (particularly not illustrated).

Figure 5:
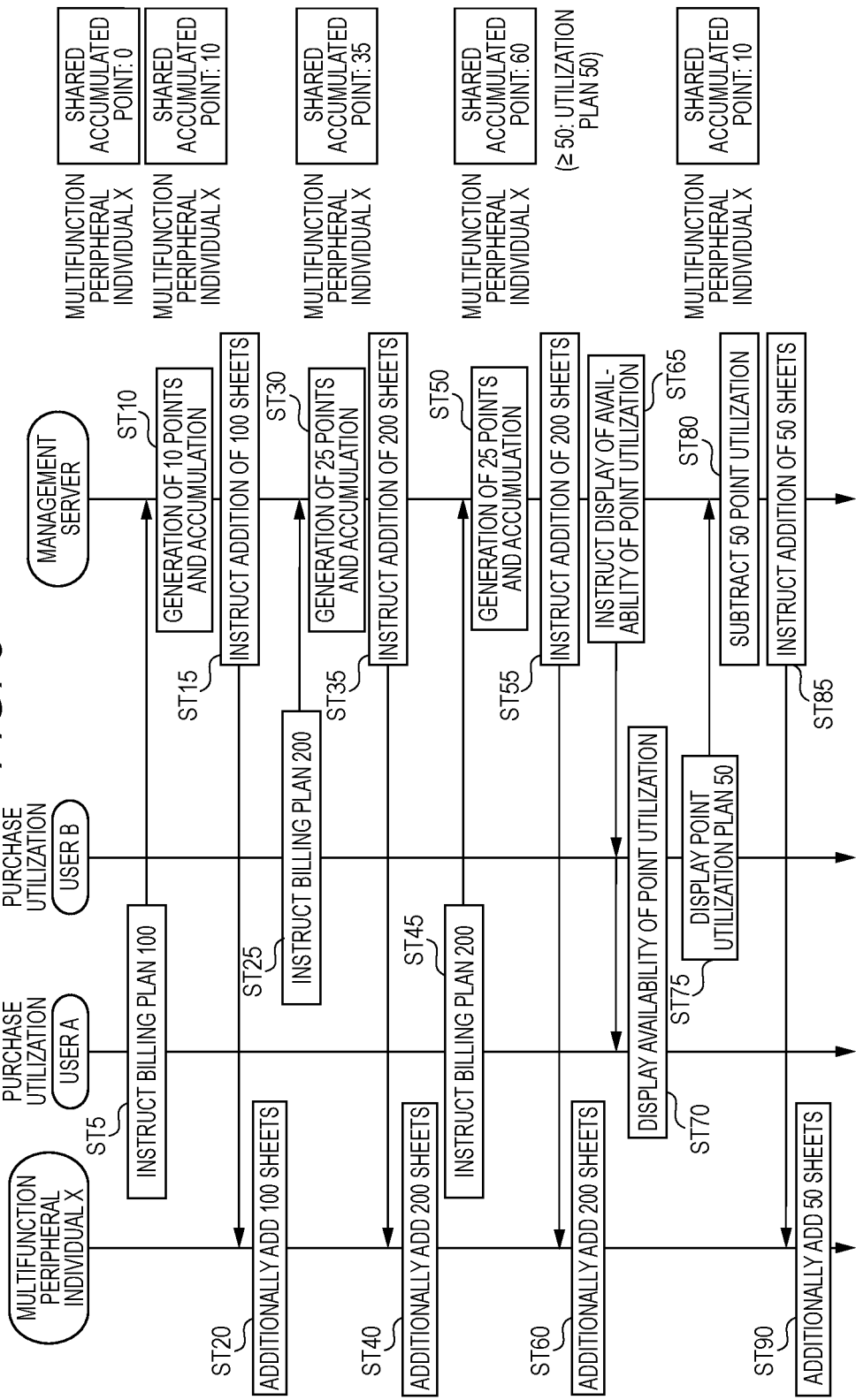
FIG. 5 is a sequence chart illustrating an example of a control procedure for embodying a method of managing a service point according to the illustrative embodiment.

{Control Procedure}
An example of a control procedure for embodying the method of managing the service point according to the present illustrative embodiment is described by the sequence chart of FIG. 5. In addition, the present sequence starts from an initial state in which the shared accumulated points corresponding to the multifunction peripheral individual X are 0.

First, when the purchasing and utilizing user A instructs the purchase of the printing authority in a billing plan 100 of adding 100 sheets to the number of printable sheets of the multifunction peripheral individual X via the operation in the mobile terminal 300 via the transaction server 400 in ST 5, the management server 100 generates and accumulates the service point in the next ST 10. Specifically, the management server 100 refers to the purchased service setting table of FIG. 3A and accumulates and adds the service points of 10 points corresponding to the billing plan 100 to the shared accumulated points corresponding to the corresponding multifunction peripheral individual X. Also, the management server 100 instructs the addition of the guaranteed printing amount of 100 sheets corresponding to the billing plan 100 to the multifunction peripheral individual X in the next ST 15, and the corresponding multifunction peripheral individual X adds 100 sheets to the number of printable sheets in ST 20.

Next, when the purchasing and utilizing user B instructs the purchase of the printing authority in a billing plan 200 in ST 25, the management server 100 accumulates and adds the service points of 25 points corresponding to the billing plan 200 to the shared accumulated points in ST 30. Also, the management server 100 instructs to add the guaranteed printing amount of 200 sheets to the multifunction peripheral individual X in the next ST 35, and the corresponding multifunction peripheral individual X adds 200 sheets to the number of printable sheets in ST 40. At this point of time, the shared accumulated points corresponding to the multifunction peripheral individual X become 35 points.

Next, when the purchasing and utilizing user A instructs the purchase of the printing authority in the billing plan 200 in ST 45, the management server 100 accumulates and adds the service points of 25 points corresponding to the billing plan 200 to the shared accumulated points in the next ST 50. Also, the management server 100 instructs the addition of the guaranteed printing amount of 200 sheets to the multifunction peripheral individual X in the next ST 55, and the corresponding multifunction peripheral individual X adds 200 sheets to the number of printable sheets in ST 60. At this time, the shared accumulated points corresponding to the multifunction peripheral individual X become 60 points, and the management server 100 determines that the shared accumulated points become equal to or more than 50 points of the minimum points to be used, and the point utilization plan 50 can be applied. Accordingly, in ST 65, the management server 100 notifies the mobile terminals 300 of all the purchasing and utilizing users A and B of the number of points of the shared accumulated points at that time and availability of the utilization in the point utilization plan 50 and instructs the mobile terminals 300 to display the notification. In ST 70, the mobile terminals 300 that receive the notification and instruction display the number of notified shared accumulated points and display that the utilization instruction operation in the point utilization plan 50 can be performed.

Thereafter, at any timing, when the purchasing and utilizing user (the user B in the illustrated example) performs operation to instruct the execution of the point utilization plan 50, the mobile terminal 300 instructs the management server 100 to utilize corresponding points in ST 75. Next, the management server 100 subtracts 50 points from the shared accumulated points according to the point utilization plan 50 instructed, in ST 80, and instructs the addition of the guaranteed printing amount of 50 sheets to the multifunction peripheral individual X in the next ST 85. Also, in the next ST 90, the multifunction peripheral individual X adds 50 sheets to the number of printable sheets. As a result, the shared accumulated points become 10 points. In addition, the purchasing and utilizing users A and B may perform utilization instruction in the corresponding plan after the shared accumulated points reach 80 points required for the next point utilization plan 80.

In addition, in the above sequence, the process received by the management server 100 with respect to the instruction of each billing plan in procedures of STs 5, 25, and 45 is an example of an obtainment application reception process and an obtainment application reception unit, each procedure of STs 15, 35, and 55 is an example of a paid printing amount addition process and a paid printing amount addition unit, and each procedure of STs 10, 30, and 50 is an example of a first authorization process and a first authority provision unit, a process received by the management server 100 with respect to the point utilization instruction in the procedure of ST 75 is an example of a first utilization application receiving process and a first utilization application reception unit, a procedure of ST 85 is an example of a first free printing amount addition process and a first free printing amount addition unit, and the number of sheets of 50 sheets added to the number of printable sheets is an example of the value of the utilized printing amount.

{Advantages of Present Illustrative Embodiment}

As described above, when each of the purchasing and utilizing users A and B applies the purchase of the printing authority in a paid billing plan in each procedure of STs 5, 25, and 45 for the multifunction peripheral individual X, the management server 100 in the printing service providing system 1 according to the present illustrative embodiment receives the application. When the application is received, in each procedure of STs 15, 35, and 55, the number of purchased sheets relating to the corresponding billing plan is added to the number of printable sheets of the multifunction peripheral individual X. The purchasing and utilizing users A and B can increase the number of printable sheets by an amount corresponding to the purchase of the printing authority in the billing plan.

According to the present illustrative embodiment, a service point for guaranteeing the number of additional sheets corresponding to the number of purchased sheets relating to the corresponding billing plan is generated. The generated service point is associated with the identification information of the multifunction peripheral individual X. According to the present illustrative embodiment, the service point is associated with the multifunction peripheral individual X as the shared accumulated point, and thus anyone who is a user who uses the corresponding multifunction peripheral individual X can utilize the corresponding service point.

In addition, the management server 100 according to the present illustrative embodiment receives the application of the utilization of the corresponding shared accumulated points instructed from the purchasing and utilizing users A and B in ST 75. When the utilization application of the shared accumulated points is received, within the number of additional sheets corresponding to the shared accumulated points associated with the multifunction peripheral individual X, the number of additional sheets requested to be utilized is added to the number of printable sheets in the procedure of ST 85. The purchasing and utilizing users A and B can increase the number of printable sheets by the amount applied to be utilized, within the number of additional sheets of the shared accumulated points associated with the multifunction peripheral individual X.

According to the present illustrative embodiment, the shared accumulated points that guarantee the number of additional sheets are associated with the multifunction peripheral individual X, and thus each user who uses the multifunction peripheral individual X can increase the number of printable sheets of the multifunction peripheral individual X for free by performing utilization application so that convenience increases. According to the present illustrative embodiment, by the improvement of the convenience, the utilization promotion of the prepaid printing service can be achieved.

In addition, according to the present illustrative embodiment, particularly, in the procedure of ST 75, a utilization application from the utilizing users C and D other than the purchasing and utilizing users A and B is not received, and a user from which the utilization application can be received is limited to the purchasing and utilizing users A and B. According to the present illustrative embodiment, if necessary, a predetermined restriction can be applied to a user who can increase the number of printable sheets.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

{Modification 1: Enabling Utilization of Service Point also for Utilizing User}

In the example of the above illustrative embodiment, the utilization instruction of the shared accumulated points associated with the multifunction peripheral individual X can be performed only by the purchasing and utilizing users A and B, but the utilization of the service points may be performed by the other utilizing users C and D. That is, all service points generated corresponding to the multifunction peripheral individual X is managed to be accumulated and utilized so that the service points can be shared by all the users A, B, C, and D who can utilize the corresponding multifunction peripheral individual X. In this case, the utilizing users C and D who are not registered to the management server 100 performs the confirmation whether the utilization of shared accumulated points can be performed and the operation of the utilization instruction by the operation via the display 240 and the operation device 250 in the multifunction peripheral individual X. Incidentally, in a case the utilizing users C and D are registered to the management server 100, the same procedures as STs 75 to 90 of FIG. 5 may be performed.

Figure 6:
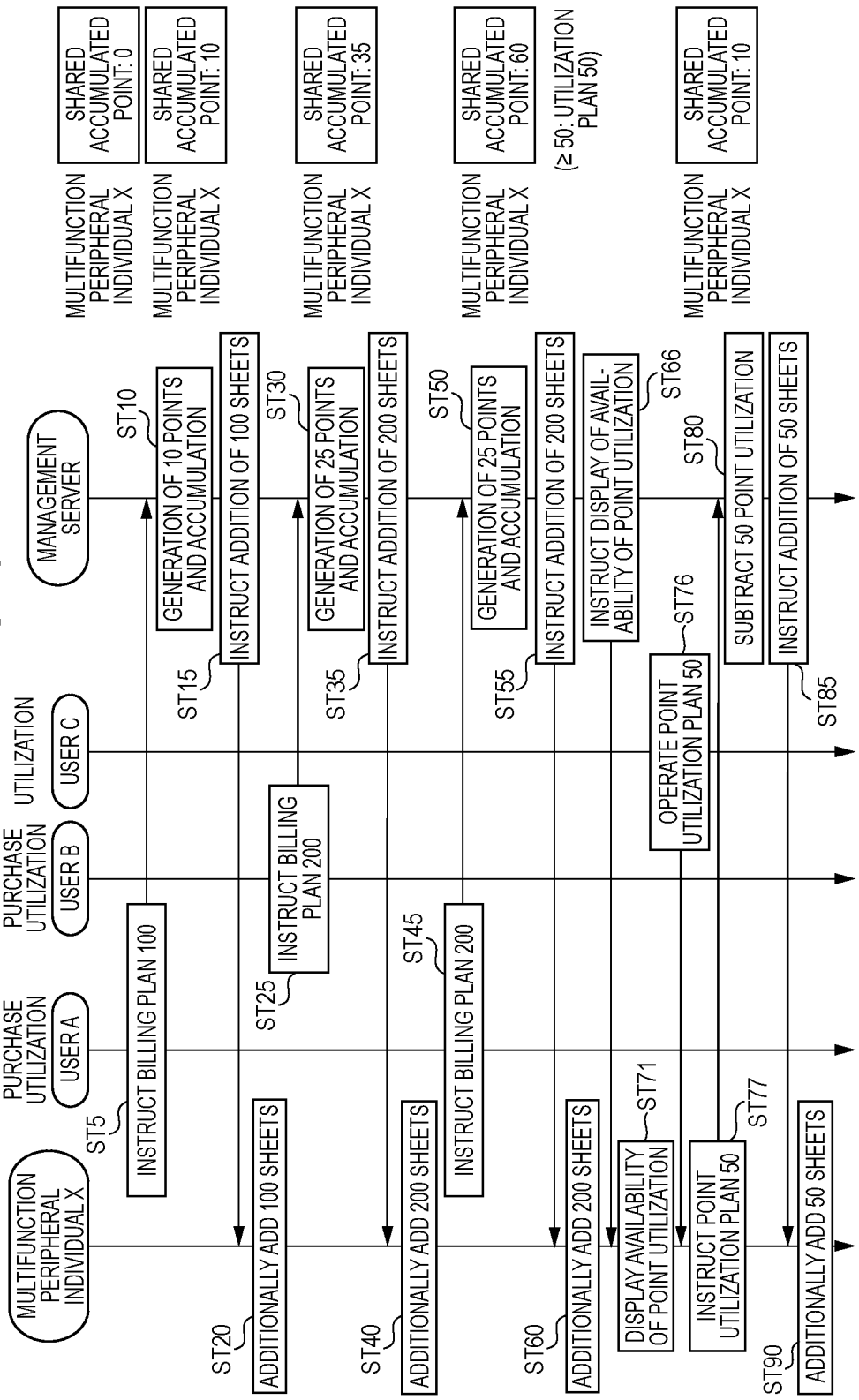
FIG. 6 is a sequence chart illustrating an example of a control procedure for embodying a method of managing a service point according to the illustrative embodiment when a utilizing user is enabled to utilize a service point.

The sequence chart in the case of the present modification is illustrated in FIG. 6. In FIG. 6, unlike FIG. 5 of the above illustrative embodiment, in ST 66 instead of ST 65, the management server 100 notifies the multifunction peripheral individual X of the number of points of shared accumulated points at that time and availability of the utilization in the point utilization plan 50 and instructs the multifunction peripheral individual X to display the notification. In ST 71, the multifunction peripheral individual X that receives the notification and instruction displays the number of notified shared accumulated points and displays that the utilization instruction operation in the point utilization plan 50 can be performed. Thereafter, at any timing, when any one of all the users A, B, C, and D (the utilizing user C in the illustrated example) operates the multifunction peripheral individual X to instruct to perform the point utilization plan 50 in ST 76, the corresponding multifunction peripheral individual X instructs the corresponding utilization of the point to the management server 100 in ST 77. Also, subtraction of the shared accumulated points by the management server 100 in the same manner as in the illustrative embodiment in the procedure of ST 80 and subsequent steps, instruction of adding the number of printable sheets to the multifunction peripheral individual X in ST 85, and addition of the number of printable sheets in the multifunction peripheral individual X in ST 90 are performed. In addition, in this case, the process of the management server 100 that receives the utilization instruction in the procedure of ST 77 in this case is an example of a first utilization application receiving process.

As described above, in the present modification, in the process of the management server 100 that receives the utilization instruction in the procedure of ST 77, the user from which the utilization application can be received is not limited to the purchasing and utilizing users A and B, and an application from the utilizing users C and D in addition to the purchasing and utilizing users A and B is received. According to the present modification, anyone who is the user of the multifunction peripheral individual X can increase the number of printable sheets.

{Modification 2: Automatically Perform Utilization of Shared Accumulated Point}

In the above illustrative embodiment and Modification 1, the utilization of the shared accumulated points associated with the multifunction peripheral individual X is first performed by the instruction from the user. In contrast, the management server 100 may automatically utilize the shared accumulated points. Specifically, when the management server 100 determines that the shared accumulated points are equal to or more than 50 points of the minimum points to be used so that the point utilization plan 50 can be applied, the management server 100 applies the point utilization plan 50 without waiting for the utilization instruction from the users A, B, C, and D.

Figure 7:
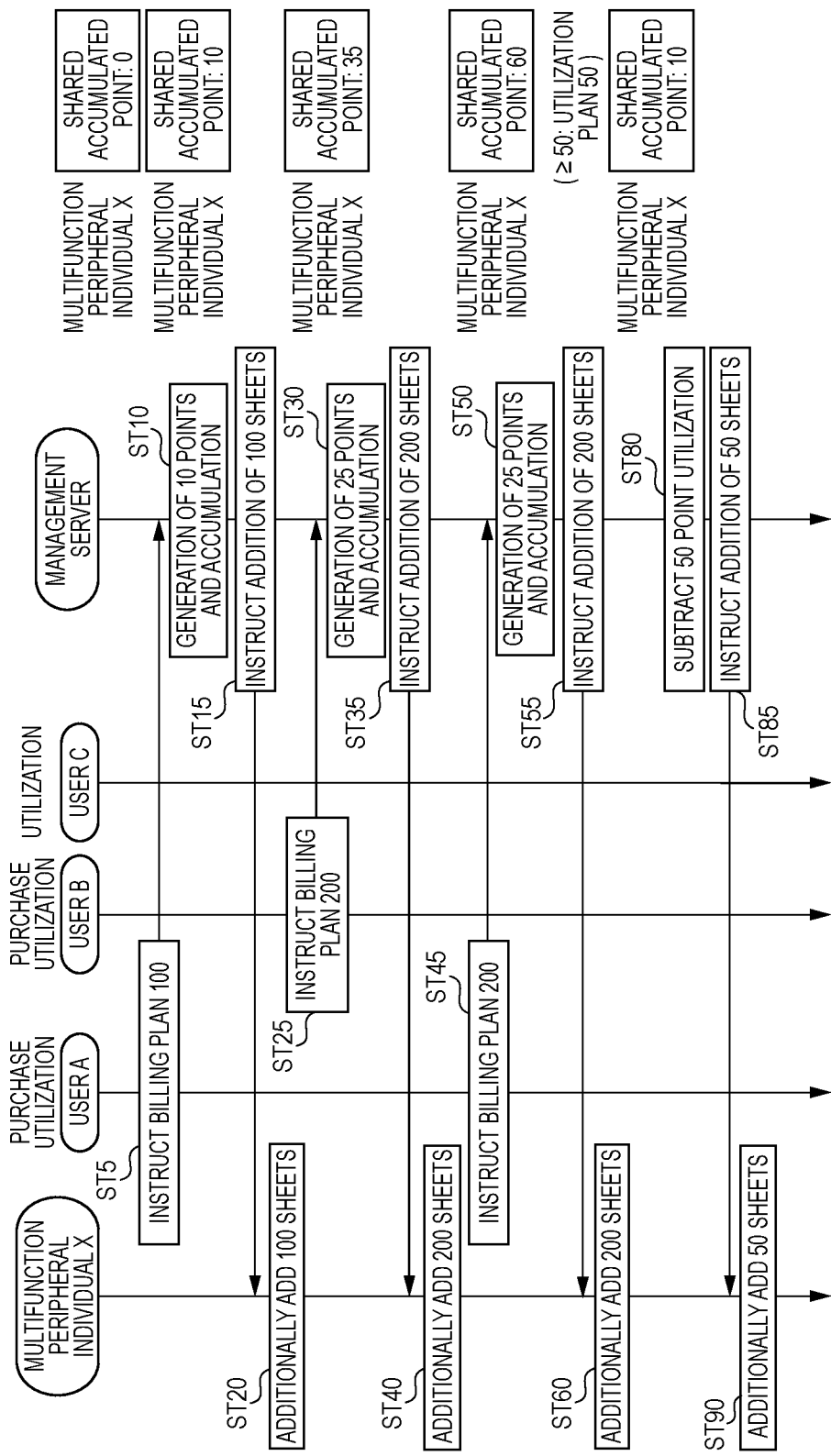
FIG. 7 is a sequence chart illustrating an example of a control procedure for embodying a method of managing a service point according to the illustrative embodiment when shared accumulated points are automatically utilized.

A sequence chart according to the present modification is illustrated in FIG. 7. In this FIG. 7, unlike FIG. 5 of the above illustrative embodiment, after the management server 100 performs the procedure of ST 55, the procedure of ST 65 or 66 is omitted, the process proceeds to ST 80 and the shared accumulated points are subtracted, instruction of adding the number of printable sheets to the multifunction peripheral individual X is performed in ST 85, and the multifunction peripheral individual X adds the number of printable sheets in ST 90. In addition, in this case, that the shared accumulated point is equal to or more than the minimum points to be used is an example of the predetermined condition, a value of 50 sheets of the number of additional sheets is an example of a value of a predetermined printing amount, 50 points are an example of a predetermined threshold value, and the procedure of ST 85 is an example of an automatic free printing amount addition process and a third free printing amount addition process.

As described above, in the present modification, under the condition in which the shared accumulated points are equal to or more than 50 points of the minimum points to be used, even if a utilization application from the users A, B, C, and D is not received, in the procedure of ST 85, the management server 100 automatically adds 50 sheets of the number of additional sheets corresponding to the shared accumulated point associated with the multifunction peripheral individual X to the number of printable sheets.

In this manner, according to the present modification, when the number of additional sheets corresponding to the service points increases by repeating the purchase as above and reaches 50 sheets of the threshold value, 50 sheets of the number of additional sheets corresponding to the threshold value are added to the number of printable sheets in the procedure of ST 85.

According to the present modification, if an addable number of sheets of the service point increases to some extent by repeating the purchase by the purchasing and utilizing users A and B, the number of additional sheets by the threshold value is automatically added to the number of printable sheets to be increased, and thus the convenience can be further increased.

{Modification 3: Switch User-Specific Accumulated Point and Shared Accumulated Point}

In the above illustrative embodiment and each modification, all the generated service points are managed as shared accumulated points associated with the multifunction peripheral individual X. In contrast, the service point generated according to the purchase event may be also managed as the user-specific accumulated point associated with an individual of the purchasing and utilizing user who performs the corresponding purchase event.

Specifically, though particularly not illustrated, the management server 100 can switch two of the shared management control mode and the user-specific management control mode. In the shared management control mode, in the same manner as in the above illustrative embodiment, the procedure of STs 10, 30, and 50, the procedure of receiving the utilization instruction in the procedure of ST 70, and the procedure of ST 85, each user who uses the multifunction peripheral individual X as above can increase the number of printable sheets of the corresponding multifunction peripheral individual X for free, to obtain high convenience.

In the user-specific management control mode, whenever a process of receiving the purchase application of the billing plan in each procedure of STs 5, 25, and 45 is performed, in each procedure of STs 10, 30, and 50, a service point that guarantees the number of additional sheets corresponding to the number of purchased sheets relating to the billing plan is generated. As shown in the purchasing and utilizing user management table illustrated in FIG. 8, the generated service point is stored as a user-specific accumulated point associated with the identification information of the purchasing and utilizing user who performs the corresponding purchase.

In the management server 100 according to the present modification, for example, when the purchase application of the billing plan is repeated by the purchasing and utilizing user A or B, and the number of additional sheets of the user-specific accumulated points associated with each of the corresponding purchasing and utilizing user A and B is accumulated to some extent, if the corresponding purchasing and utilizing user A or B applies the utilization of the user-specific accumulated point, the application is received in the management server 100. Within the number of additional sheets corresponding to the user-specific accumulated point associated with the corresponding purchasing and utilizing user A or B, the number of additional sheets requested to be utilized is added to the number of printable sheets. The corresponding purchasing and utilizing user A or B can increase the value of the number of printable sheets by an amount applied to be utilized, within the number of additional sheets of the user-specific accumulated point associated with the user identification information.

In addition, in the above, the shared management control mode is an example of a first control mode, and a user-specific management control mode is an example of a second control mode. A process of associating the generated point with the identification information of the purchasing and utilizing user A or B as the user-specific accumulated point is an example of a second authority provision process, a process of receiving the utilization application of the user-specific accumulated point is an example of a second utilization application receiving process, and a process of adding the number of additional sheets to the number of printable sheets as a user-specific accumulated point applied to be utilized is an example of a second free printing amount addition process.

According to the present modification, a shared management control mode in which the shared accumulated point is associated with the multifunction peripheral individual X, and the corresponding shared accumulated point can be shared and utilized by the plurality of users A, B, C, and D of the multifunction peripheral individual X, and a user-specific management control mode in a method in the related art, in which the user-specific accumulated point is associated with each of the purchasing and utilizing users A and B and utilized uniquely by each of the purchasing and utilizing users A and B are provided. According to the present modification, two control modes can be properly used according to the usage form or the usage method of the multifunction peripheral individual X, and thus the convenience can be further increased.

In addition, according to the present modification, the shared management control mode or the user-specific management control mode is selectively switched according to a mode selection signal based on a manual selection operation in the mobile terminal 300 by the purchasing and utilizing users A and B or predetermined information based on an operation on the mobile terminal 300. Accordingly, in the mobile terminal 300, the purchasing and utilizing users A and B performs a manual selection operation so that the mode selection signal based on this operation or predetermined information is input to the management server 100 so as to selectively switch the mode to any one of the shared management control mode and the user-specific management control mode.

Further, according to the present modification, the purchasing and utilizing users A and B appropriately performs a manual selection operation when performing a purchase application of the billing plan, so that the output mode selection signal is input to the management server 100. When the shared management control mode is selected, each of the purchasing and utilizing users A and B can increase the number of printable sheets of the multifunction peripheral individual X by using the number of additional sheets of the shared accumulated point associated with the multifunction peripheral individual X described above. When the user-specific management control mode is selected, the purchasing and utilizing user can increase the number of printable sheets by using the number of additional sheets of the user-specific accumulated point associated with the user identification information. According to the present modification, when the purchasing and utilizing users A and B purchase the billing plan, the purchasing and utilizing users A and B can select any one of the two control modes according to their preferences and usage forms, and thus the convenience can be further increased.

Further, according to the present modification, when the purchasing and utilizing users A and B perform the purchase application of the billing plan, the mode can be selectively switched to the shared management control mode or the user-specific management control mode according to price billing destination information. Accordingly, for example, when the price is paid by a company or the like to which the purchasing and utilizing users A and B belong, the mode is switched to the shared management control mode, each of the purchasing and utilizing users A and B increases the number of printable sheets of the multifunction peripheral individual X by using the number of additional sheets of the shared accumulated point associated with the multifunction peripheral individual X described above. For example, when the price is paid from the personal accounts of the purchasing and utilizing users A and B, the mode is switched to the user-specific management control mode, the purchasing and utilizing users A and B can increase the number of printable sheets by using the number of additional sheets of the user-specific accumulated point associated with the user identification information. According to the present modification, a mode considered to be suitable among the above two control modes can be automatically selected depending on the billing destination of the price when the purchasing and utilizing users A and B purchase the billing plan, and thus the convenience can be further increased.

In addition, according to the present modification, when the plurality of purchasing and utilizing users A and B each own the user-specific accumulated points in advance, the additional numbers of sheets of the user-specific accumulated points of the respective purchasing and utilizing users A and B are summed up, the summed number of additional sheets that is the summed value may be gathered and associated with the multifunction peripheral individual X. In addition, the summed number of additional sheets in this case is an example of a summed free guaranteed printing amount. According to the present modification, the additional numbers of sheets of the user-specific accumulated points associated with the plurality of purchasing and utilizing users A and B are gathered in advance and associated with the multifunction peripheral individual X, and then each of the purchasing and utilizing users A and B can increase the number of printable sheets of the multifunction peripheral individual X by using the number of additional sheets associated with the multifunction peripheral individual X. In addition, a process of associating the summed number of additional sheets with the multifunction peripheral individual X is an example of a third authorization process.

{Modification 4: Only Purchasing and Utilizing User Sums up and Utilizes Shared Accumulated Point}

According to the illustrative embodiment and each modification, a case where generation of a service point and utilization thereof are performed on one multifunction peripheral individual X is described. In addition, shared accumulated points of the individuals of the plurality of multifunction peripherals 200 may be summed up and utilized.

Specifically, though particularly not illustrated, there are the individual X and the individual Y as the multifunction peripheral 200, the shared accumulated point for the individual X that guarantees the number of additional sheets for the individual X can be associated with the identification information of the multifunction peripheral individual X. The shared accumulated point for the individual Y that guarantees the number of additional sheets for the individual Y is associated with the identification information of the multifunction peripheral individual Y.

The users include the purchasing and utilizing users A and B having purchase utilization attributes of possessing the mobile terminals 300 and the utilizing users C and D having utilization attributes of not possessing the mobile terminals 300. When the management server 100 receives the shared accumulated point for the individual X that is associated with the identification information of the multifunction peripheral individual X by the purchasing and utilizing users A and B and a utilization application of a shared accumulated point for the individual Y that is associated with the identification information of the multifunction peripheral individual Y in the process of receiving the utilization application of the shared accumulated point for the individual X, in the process of adding the number of additional sheets to the number of printable sheets, according to the receiving of the corresponding utilization application, the number of additional sheets for the individual X corresponding to the shared accumulated point for the individual X that is associated with the identification information of the multifunction peripheral individual X, the number of additional sheets for the individual Y corresponding to the shared accumulated point for the individual Y that is associated with the identification information of the multifunction peripheral individual Y, and the number of additional sheets utilized within the summed number of additional sheets are added to any one of the number of printable sheets of the individual X relating to the multifunction peripheral individual X or the number of printable sheets of the individual Y relating to the multifunction peripheral individual Y.

In addition, in the process of receiving the utilization application of the shared accumulated point for the individual X, when the management server 100 receives the utilization application of the shared accumulated point for the individual X which is associated with the identification information of the multifunction peripheral individual X by the utilizing users C and D, in the process of adding the number of additional sheets for the individual X, the number of additional sheets utilized within the number of additional sheets for the individual X corresponding to the shared accumulated point for the individual X associated with the identification information of the multifunction peripheral individual X, according to the receiving of the corresponding utilization application can be added only to the number of printable sheets for the individual X relating to the multifunction peripheral individual X.

In addition, when the management server 100 receives the utilization application of the shared accumulated point for the individual Y associated with the identification information of the multifunction peripheral individual Y by the utilizing users C and D in the process of receiving the utilization application of the shared accumulated point for the individual X, in the process of adding the number of additional sheets for the individual Y, according to the receiving of the corresponding utilization application, the number of additional sheets utilized within the number of additional sheets for the individual Y corresponding to the shared accumulated point for the individual Y associated with the identification information of the multifunction peripheral individual Y can be added only to the number of printable sheets for the individual Y relating to the multifunction peripheral individual Y.

In addition, in the above, the multifunction peripheral individual X is an example of a first printing device, the multifunction peripheral individual Y is an example of a second printing device, the identification information of the multifunction peripheral individual X is an example of first identification information, the identification information of the multifunction peripheral individual Y is an example of second identification information, the number of additional sheets for the individual X is an example of a first free guaranteed printing amount, the number of additional sheets for the individual Y is an example of a second free guaranteed printing amount, a shared accumulated point for the individual X is an example of first free authority information, a shared accumulated point for the individual Y is an example of second free authority information, a purchase utilization attribute of possessing the mobile terminal 300 is an example of a first attribute, a utilization attribute of not possessing the mobile terminal 300 is an example of a second attribute, the purchasing and utilizing user A or B is an example of a first user, the utilizing user C or D is an example of a second user, the number of printable sheets for the individual X is an example of a first allowable printing amount, and the number of printable sheets for the individual Y is an example of a second allowable printing amount.

According to the present modification, the multifunction peripheral individual X and the multifunction peripheral individual Y are associated respectively with the number of additional sheets for the individual X of the shared accumulated point for the individual X, and the number of additional sheets for the individual Y of the shared accumulated point for the individual Y, these two additional numbers of sheets are summed up according to the attributes of the users.

When utilization application is performed by the purchasing and utilizing user A or B, the summed accumulated value of the number of additional sheets for the individual X and the number of additional sheets for the individual Y are calculated, the number of additional sheets less than the summed accumulated value can be added to the number of printable sheets of any one of the multifunction peripheral individual X and the multifunction peripheral individual Y.

When utilization application is performed by the utilizing user C or D, either of the addition of the number of additional sheets of the number of additional sheets for the individual X to the number of printable sheets for the individual X of the multifunction peripheral individual X or the addition of the number of additional sheets of the number of additional sheets for the individual Y to the number of printable sheets for the individual Y of the multifunction peripheral individual Y.

According to the present modification, when the number of additional sheets is associated with the plurality of multifunction peripheral individuals X and Y, the plurality of these additional numbers of sheets can summed up and applied to the respective multifunction peripheral individuals X and Y for the limited special purchasing and utilizing users A and B. According to the present modification, sharing of the number of additional sheets in the plurality of multifunction peripheral individuals X and Y can be achieved, and further the convenience can be enhanced depending on the users.

In addition, in the above, the sequence charts illustrated in FIGS. 5, 6, and 7 and the like do not limit the present invention to the procedures shown in the corresponding sequence charts, and procedures may be added, deleted, or changed in order without departing from the scope and technical ideas of the invention.

In addition to the description above, the methods according to the above illustrative embodiment and each modification may be appropriately combined and utilized.

In addition, although not exemplified one by one, the present invention can be implemented together with various modifications without departing from the scope of the present invention.

What is claimed is:

1. An information processing apparatus comprising:
   a communication interface that is communicable with a printing device configured to form an image on a printing medium via a network; and
   a control device configured to:
     receive an obtainment application of paid authority information, the paid authority information guaranteeing a paid guaranteed printing amount by a purchasing user;
     whenever the obtainment application of the paid authority information is received, add a value of the paid guaranteed printing amount relating to the paid authority information to a value of an allowable printing amount for the printing device;
     perform a first authorization process comprising associating free authority information with identification information of the printing device, the free authority information guaranteeing a free guaranteed printing amount corresponding to the paid guaranteed printing amount;
     receive a first utilization application, the first utilization application comprising a utilization application of the free authority information associated with the identification information of the printing device; and
     based on receiving the first utilization application, add a value of a utilized printing amount to the value of the allowable printing amount, the utilized printing amount being within the free guaranteed printing amount corresponding to the free authority information associated with the identification information of the printing device.

2. The information processing apparatus according to claim 1, wherein in the receiving of the first utilization application, the control device is configured to receive the first utilization application from an authority utilizing user who is the purchasing user and not to receive the first utilization application from the authority utilizing user other than the purchasing user.

3. The information processing apparatus according to claim 1, wherein in the receiving of the first utilization application, the control device is configured to receive both the first utilization application from an authority utilizing user who is the purchasing user and the first utilization application from the authority utilizing user other than the purchasing user.

4. The information processing apparatus according to claim 1, wherein the control device is further configured to:
   under a predetermined condition, even if the first utilization application is not received in the receiving of the first utilization application, automatically add a value of a predetermined printing amount within the free guaranteed printing amount to the value of the allowable printing amount, the free guaranteed printing amount corresponding to the free authority information associated with the identification information of the printing device.

5. The information processing apparatus according to claim 1,
   wherein the control device has a first control mode and a second control mode,
   wherein in the first control mode, the control device is configured to perform the first authorization process and to receive the first utilization application, and
   wherein in the second control mode, the control device is configured to:
     perform a second authorization process comprising associating the free authority information with user identification information of the purchasing user relating to the obtainment application, the free authority information indicating the free guaranteed printing amount corresponding to the paid guaranteed printing amount;
     receive a second utilization application, the second utilization application comprising a utilization application of the free authority information associated with the user identification information by the purchasing user; and
     based on receiving the second utilization application, add the value of the utilized free guaranteed printing amount to the value of the allowable printing amount, the utilized free guaranteed printing amount being within the free guaranteed printing amount corresponding to the free authority information associated with the user identification information.

6. The information processing apparatus according to claim 5, wherein the control device is configured to selectively switch the first control mode or the second control mode according to a mode selection signal based on a manual selection operation in an external device or according to predetermined information based on an operation on the external device.

7. The information processing apparatus according to claim 6, wherein the control device is configured to:
   in the receiving of the obtainment application, receive the obtainment application of the paid authority information and to input the mode selection signal based on the manual selection operation of the purchasing user;
   in a case the first control mode is selected in the mode selection signal, perform the first authorization process, receive the first utilization application and add the value of the utilized printing amount corresponding to the first control mode; and
   in a case the second control mode is selected in the mode selection signal, perform the second authorization process, receive the second utilization application and add the value of the utilized free guaranteed printing amount according to the corresponding second control mode.

8. The information processing apparatus according to claim 6, wherein the first control mode or the second control mode is selectively switched according to price billing destination information of the paid authority information as the predetermined information.

9. The information processing apparatus according to claim 1, wherein the control device is further configured to:
   in a case the free guaranteed printing amount corresponding to the free authority information associated with identification information of the printing device reaches a predetermined threshold value, add predetermined amount from the free guaranteed printing amount to the value of the allowable printing amount added in the adding of the value of the paid guaranteed printing amount.

10. The information processing apparatus according to claim 1,
wherein a plurality of items of free authority information are respectively associated with a plurality of purchasing users in advance, and
wherein the control device is further configured to:
perform a third authorization process comprising associating a summed free guaranteed printing amount obtained by summing up free guaranteed printing amounts respectively relating to the plurality of items of free authority information with the identification information of the printing device.

11. The information processing apparatus according to claim 1,
wherein the printing device comprises a first printing device and a second printing device,
wherein first free authority information is associated with first identification information of the first printing device, the first free authority information guaranteeing a first free guaranteed printing amount,
wherein second free authority information is associated with second identification information of the second printing device, the second free authority information guaranteeing a second free guaranteed printing amount,
wherein an authority utilizing user includes a first user having a first attribute and a second user having a second attribute, and
wherein the control device is configured to:
in the receiving of the first utilization application, in a case of receiving, from the first user, the first utilization application comprising a utilization application of the first free authority information associated with the first identification information of the first printing device and the second free authority information associated with the second identification information of the second printing device,
add the value of a utilized free guaranteed printing amount to any one of the value of first allowable printing amount relating to the first printing device or the value of second allowable printing amount relating to the second printing device, the utilized free guaranteed printing amount being within sum of the first free guaranteed printing amount and the second free guaranteed printing amount;
in the receiving of the first utilization application, in a case of receiving, from the second user, the first utilization application comprising a utilization application of the first free authority information associated with the first identification information of the first printing device,
add the value of the utilized free guaranteed printing amount to the value of the first allowable printing amount relating to the first printing device, the utilized free guaranteed printing amount being within the first free guaranteed printing amount; and
in the receiving of the first utilization application, in a case of receiving, from the second user, the first utilization application comprising a utilization application of the second free authority information associated with the second identification information of the second printing device,
add the value of the utilized free guaranteed printing amount only to the value of the second allowable printing amount relating to the second printing device, the utilized free guaranteed printing amount being within the second free guaranteed printing amount.

12. A printing authority management system comprising:
a printing device configured to form an image on a printing medium within an allowable printing amount; and
a control device configured to:
receive an obtainment application of paid authority information, the paid authority information guaranteeing a paid guaranteed printing amount by a purchasing user for each purchasing user;
whenever the obtainment application of the paid authority information is received, add a value of the paid guaranteed printing amount relating to the paid authority information to a value of the allowable printing amount;
associate free authority information with identification information of the printing device, the free authority information guaranteeing a free guaranteed printing amount corresponding to the paid guaranteed printing amount;
receive a first utilization application, the first utilization application comprising a utilization application of the free authority information associated with the identification information of the printing device by an authority utilizing user; and
based on receiving the first utilization application, add a value of a utilized printing amount to the value of the allowable printing amount, the utilized printing amount being within the free guaranteed printing amount corresponding to the free authority information associated with the identification information of the printing device.

13. The printing authority management system according to claim 12, wherein in the receiving of the first utilization application, the control device is configured to receive the first utilization application from an authority utilizing user who is the purchasing user and not to receive the first utilization application from the authority utilizing user other than the purchasing user.

14. The printing authority management system according to claim 12, wherein in the receiving of the first utilization application, the control device is configured to receive both the first utilization application from an authority utilizing user who is the purchasing user and the first utilization application from the authority utilizing user other than the purchasing user.

15. The printing authority management system according to claim 12, wherein the control device is further configured to:
under a predetermined condition, even if the first utilization application is not received in the receiving of the first utilization application, automatically add a value of a predetermined printing amount within the free guaranteed printing amount to the value of the allowable printing amount, the free guaranteed printing amount corresponding to the free authority information associated with the identification information of the printing device.

16. The printing authority management system according to claim 12,
wherein the control device has a first control mode and a second control mode,
wherein in the first control mode, the control device is configured to associate the free authority information with the identification information of the printing device and to receive the first utilization application, and wherein in the second control mode, the control device is configured to:
- associate the free authority information with user identification information of the purchasing user relating to the obtainment application, the free authority information indicating the free guaranteed printing amount corresponding to the paid guaranteed printing amount;
- receive a second utilization application, the second utilization application comprising a utilization application of the free authority information associated with the user identification information by the purchasing user; and
- based on receiving the second utilization application, add the value of a utilized free guaranteed printing amount to the value of the allowable printing amount, the utilized free guaranteed printing amount being within the free guaranteed printing amount corresponding to the free authority information associated with the user identification information.

17. The printing authority management system according to claim 12, wherein the control device is further configured to:
- in a case the free guaranteed printing amount corresponding to the free authority information associated with identification information of the printing device reaches a predetermined threshold value, add predetermined amount from the free guaranteed printing amount to the value of the allowable printing amount added in the adding of the value of the paid guaranteed printing amount.

18. The printing authority management system according to claim 12,
wherein a plurality of items of free authority information are respectively associated with a plurality of purchasing users in advance, and
wherein the control device is further configured to:
- associate a summed free guaranteed printing amount obtained by summing up free guaranteed printing amounts respectively relating to the plurality of items of free authority information with the identification information of the printing device.

19. The printing authority management system according to claim 12,
wherein the printing device comprises a first printing device and a second printing device,
wherein first free authority information is associated with first identification information of the first printing device, the first free authority information guaranteeing a first free guaranteed printing amount,
wherein second free authority information is associated with second identification information of the second printing device, the second free authority information guaranteeing a second free guaranteed printing amount,
wherein the authority utilizing user includes a first user having a first attribute and a second user having a second attribute, and
wherein the control device is configured to:
- in the receiving of the first utilization application, in a case of receiving, from the first user, the first utilization application comprising a utilization application of the first free authority information associated with the first identification information of the first printing device and the second free authority information associated with the second identification information of the second printing device,
  add the value of a utilized free guaranteed printing amount to any one of the value of first allowable printing amount relating to the first printing device or the value of second allowable printing amount relating to the second printing device, the utilized free guaranteed printing amount being within sum of the first free guaranteed printing amount and the second free guaranteed printing amount;
- in the receiving of the first utilization application, in a case of receiving, from the second user, the first utilization application comprising a utilization application of the first free authority information associated with the first identification information of the first printing device,
  add the value of the utilized free guaranteed printing amount to the value of the first allowable printing amount relating to the first printing device, the utilized free guaranteed printing amount being within the first free guaranteed printing amount; and
- in the receiving of the first utilization application, in a case of receiving, from the second user, the first utilization application comprising a utilization application of the second free authority information associated with the second identification information of the second printing device,
  add the value of the utilized free guaranteed printing amount only to the value of the second allowable printing amount relating to the second printing device, the utilized free guaranteed printing amount being within the second free guaranteed printing amount.

* * * * *